United States Patent [19]

Melara

[11] Patent Number: 5,119,525
[45] Date of Patent: Jun. 9, 1992

[54] CASTOR STRUCTURE

[75] Inventor: Francescantonio Melara, Bologna, Italy

[73] Assignee: Emilsider Meccanica S.p.A., Cadriano Di Granarolo Emilia, Italy

[21] Appl. No.: 646,320

[22] Filed: Jan. 28, 1991

[30] Foreign Application Priority Data

Feb. 2, 1990 [IT] Italy .................. 3330 A/9

[51] Int. Cl.⁵ .............................. B60B 33/00
[52] U.S. Cl. ...................... 16/18 R; 16/47; 16/31 R
[58] Field of Search .......... 16/18 A, 18 R, 18 CG, 16/29, 31 A, 31 R, 45, 47

[56] References Cited

U.S. PATENT DOCUMENTS

| | | | |
|---|---|---|---|
| 4,077,088 | 3/1978 | Melara | 16/47 |
| 4,219,904 | 9/1980 | Melara | 16/47 |
| 4,283,810 | 8/1981 | Demrick | 16/47 |
| 4,290,166 | 9/1981 | Melara | 16/47 |
| 4,399,586 | 8/1983 | McCarroll | 16/47 |

FOREIGN PATENT DOCUMENTS

| | | | |
|---|---|---|---|
| 1920995 | 4/1969 | Fed. Rep. of Germany . | |
| 2529201 | 2/1976 | Fed. Rep. of Germany | 16/45 |
| 2605080 | 2/1976 | Fed. Rep. of Germany . | |
| 2325281 | 9/1976 | France . | |
| 2025220 | 6/1979 | United Kingdom . | |

Primary Examiner—Robert L. Spruill
Assistant Examiner—Donald M. Gurley
Attorney, Agent, or Firm—Guido Modiano; Albert Josif

[57] ABSTRACT

The self-orientatable twin castor has a support made of plastics for a pair of coaxial wheels. The support is constituted by a tubular hub with which a substantially semicircular wall, arranged in the median plane of the castor, is rigidly associated in a perpendicular manner. A semi-cylindrical casing made of metal is associated with the edge of the wall and has wings for positioning and retaining it on the edge of the semi-circular wall.

4 Claims, 2 Drawing Sheets

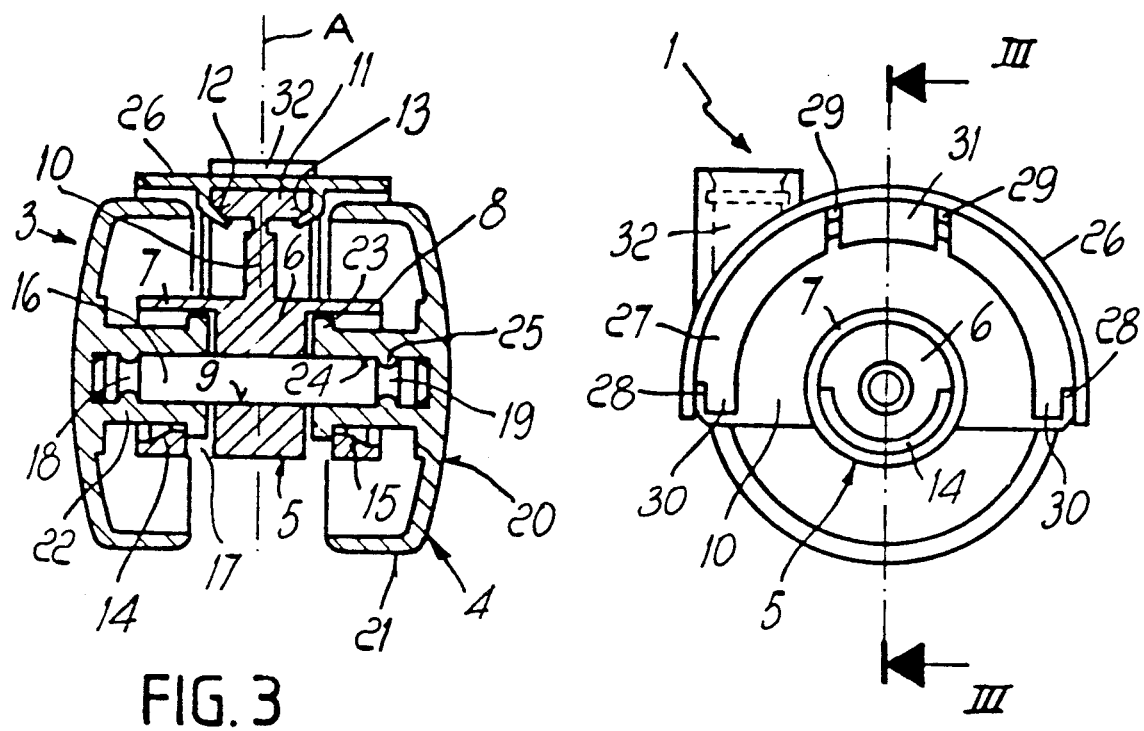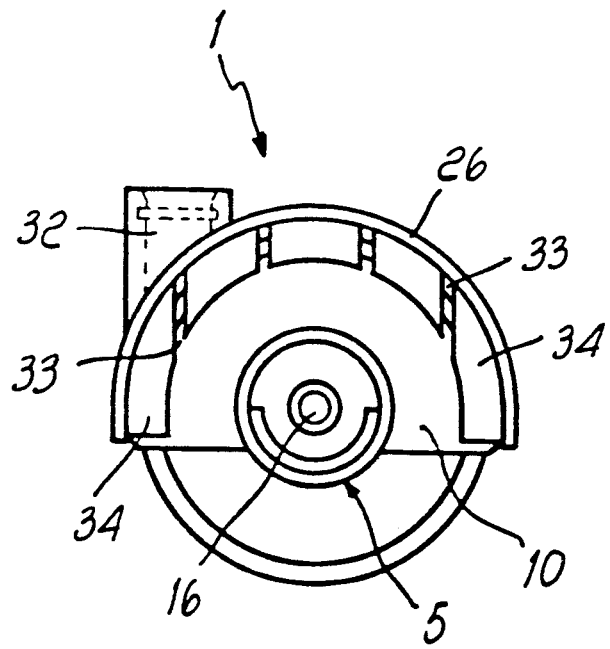

CASTOR STRUCTURE

BACKGROUND OF THE INVENTION

The present invention relates to a castor structure, and in particular to a self-orientatable twin castor of the type which comprises a pair of coaxial wheels.

Twin castors are constituted by a pair of wheels rotatably mounted on a pivot.

The pivot is horizontally supported by a tubular hub of a support which comprises a semi-cylindrical wall defining a casing or fairing-like structure which covers the upper part of the castor. A blind hole is defined in the semi-cylindrical wall, is open upward and acts as rotation seat for a vertical self-orientatable pivot intended to be inserted and fixed in an accommodation of the piece of furniture to which the castor is to be applied. The hub is internally provided with coupling elements for a collar provided externally on a hollow tang which protrudes coaxially from the respective wheel.

In conventional twin castors, the support is made of plastics or metal.

Castors in which the support is made of plastics are more economical than metallic ones. However, metallic supports are stronger and are used when the castor is designed to have a particular aesthetic appearance, such as chromium plating, brass coating, etc.

SUMMARY OF THE INVENTION

The technical aim of the present invention is to provide a twin castor which obviates the shortcomings of known castors.

Within the scope of this aim, an object of the invention is to provide a twin castor structure which offers greater resistance to wear and impacts, so as to comply with safety rules, and is at the same time more economical than conventional castors.

A further object of the invention is to provide a twin castor structure with a visible surface having a metallic appearance, which is more appreciated by users.

This aim and this object are achieved according to the invention by the present self-orientatable twin castor of the type which comprises a support for a pair of coaxial wheels, said support being constituted by a tubular hub with which a substantially semi-circular wall, arranged on the median plane of the castor, is rigidly associated in a substantially perpendicular manner, a semi-cylindrical casing extending on the edge of said wall, characterized in that said support is made of plastics and said casing is made of metal, means being provided for the placement and retention of the casing on the edge of the semi-circular wall.

BRIEF DESCRIPTION OF THE DRAWINGS

Further details of the invention will become apparent from the following detailed description of a preferred embodiment, illustrated only by way of non-limitative example in the accompanying drawings, wherein:

FIG. 2 is a side view of the castor having a wheel removed therefrom;

FIG. 3 is a sectional view, taken along the plane III—III of FIG. 2, of the twin castor according to the invention;

FIG. 4 is a side view of a further embodiment of the invention.

DESCRIPTION OF THE PREFERRED EMBODIMENTS

Figure 1:
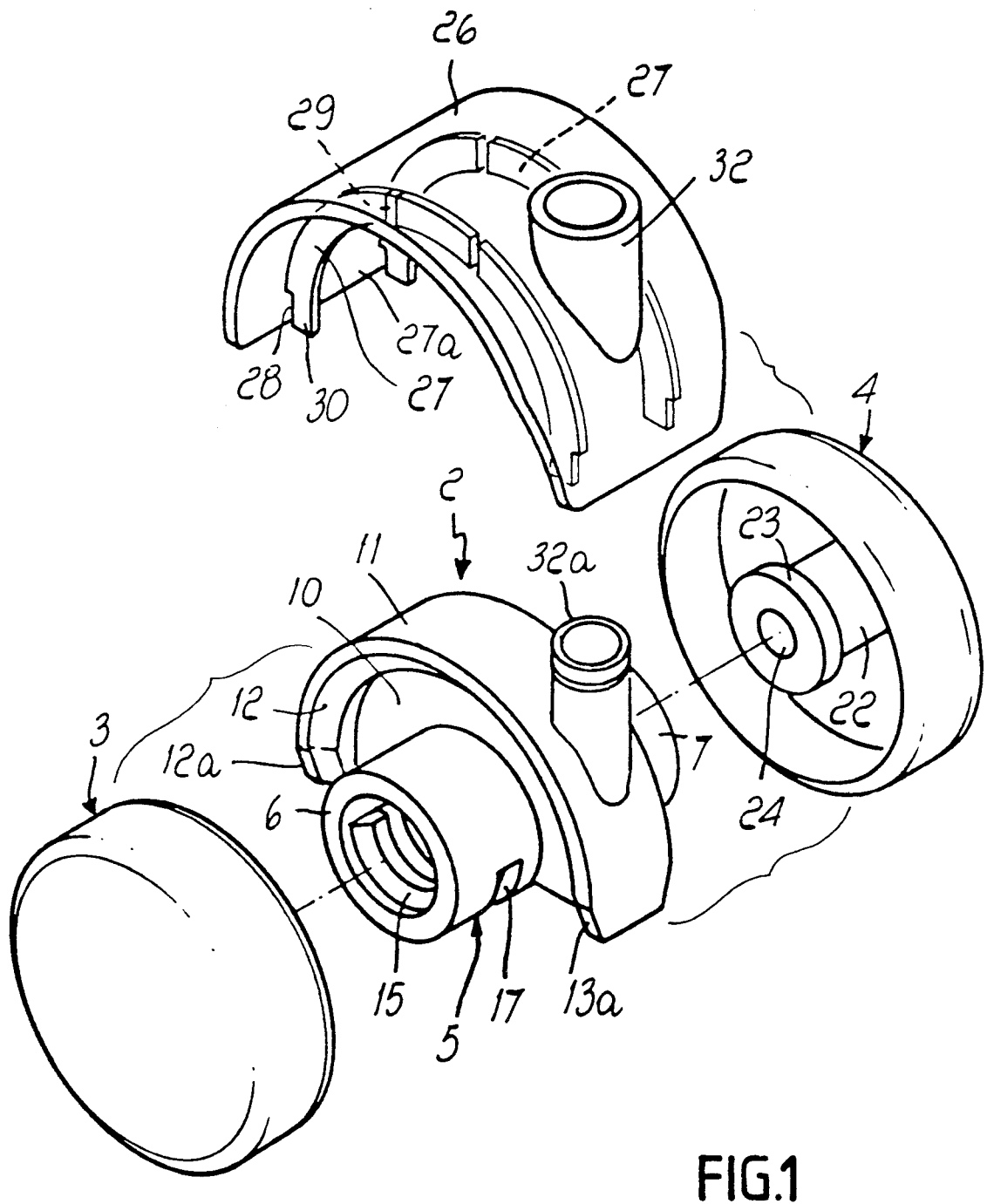
FIG. 1 is an exploded perspective view of the elements which constitute the twin castor structure according to the invention.

With reference to the above figures, the reference numeral 1 generally indicates the self-orientatable twin castor, which comprises a support 2 for supporting the pair of wheels 3, 4 which is manufactured by molding plastics and is symmetrical with respect to the median plane A.

The support 2 is formed by a horizontal hub 5 composed of a central enlarged portion 6 from which two coaxial tubular portions 7, 8 extend in opposite directions. A through hole 9 is defined in the enlarged portion 6 and is coaxial to the tubular portions 7,8. A substantially semi-circular wall 10 is rigidly associated in the plane A externally with respect to the hub 5; said wall rises vertically and has, along its edge, a semi-cylindrical wall, referred to hereinafter as a half-ring 11, which protrudes on both sides of the median plane A. The half-ring 11 is coaxial to the hub 5 and has, along its lower edges, chamfers 12, 13 and tapers 12a, 13a at its terminal portions.

Semicircular teeth 14, 15 are defined inside the tubular portions 7, 8 and have a saw-tooth cross section; said teeth define shoulders for preventing the escape of the wheels 3, 4 as will become apparent hereinafter. A slot 17 is defined in the tubular portions 7, 8, between each tooth 14, 15 and the enlarged portion 6. The slot 17 allows the extraction of an insert which, during the molding of the support 2, determines the forming of the teeth 14, 15. A pivot 16 is inserted in the hole 9 and has respective grooves 18, 19 at its opposite ends.

One of the wheels 3, 4 is applied to each end of the pivot 16; said wheels have a cambered lateral surface 20 and a cylindrical rolling surface 21.

A tubular portion 22 extends internally from the cambered surface 20 of each wheel and has, at its end, an external collar 23; said tubular portion encloses a blind hole 24, the bottom whereof is constituted by the central portion of said cambered surface. An annular ridge 25 is defined proximate to the bottom of said blind hole 24. The opposite ends of the pivot 16 are inserted by being force-fitted into the blind holes 24, so that the grooves 18, 19 are engaged by the ridges 25 so as to rotatably retain the wheels 3, 4 on the pivot 16.

The axial retention of the wheels is ensured by the engagement of the collars 23 behind the teeth 15, without compromising the rotational action of the wheels 3, 4.

The half-ring 11 supports a semi-cylindrical casing 26 made of metal, for example by pressure die-casting a Zn+Al+Mg alloy, which is coaxial to the hub 5.

Two mutually parallel ridges 27 extend along the internal surface of the casing 26 and are arranged in planes which are perpendicular to the pivot 16. Said ridges 27 delimit a seat 27a the width whereof corresponds to that of the half-ring 11.

In order to secure the casing 26 onto the half-ring 11, a series of vertical notches 28, 29 is defined in the ridges 27; the notches indicated by the reference numberal 28 run along the line which connects the ridges 27 to the internal surface of the casing 26, whereas the notches indicated by the reference numeral 29 cut said ridges radially. The notches 28, 29 define pairs of wings 30 and 31 which are bent against one another.

More precisely, the wings 30 are bent onto the tapers 12a, 13a and the wings 31 are bent onto the chamfers 12, 13, so as to ensure the fixing of the casing 26 to the support 2. In particular the wings 30, 31 avoid that the half-ring 11 may slide in the seat 27a, and that the support 2 may deflect with respect to the casing 26. A collar 32 is advantageously defined in the casing 26 and protrudes vertically therefrom. A sleeve 32a protrudes from the half-ring 11 and is integral therewith. The sleeve 32a is inserted into said collar and defines a seat for the rotatable support of a pivot (not illustrated) and allows to fix the castor 1 to a piece of furniture.

An essential prerogative of the present invention is constituted by the fact that it allows to manufacture twin castors which are economical and strong, using two types of material.

In particular, the wheels 3, 4 and the support 2 can be manufactured from polypropylene, which ensures silent rolling, whereas the load-stresses are supported by the metallic casing 26, which furthermore ensures a pleasant appearance.

It should be noted that by means of the invention, with respect to castors with a fully metallic support, one achieves a considerable saving in metal and therefore a considerable reduction in costs, since the plastics with which the support is manufactured has a significantly lower cost.

It should be noted that the casing 26 can be manufactured by pressure die-casting with conventional opening dies, without having to resort to slides or the like. Since the notches 28, 29 can be orientated in the opening direction of the mold, they in fact do not lead to undercuts capable of preventing the removal of the part from the die. In a further embodiment of the invention, illustrated in FIG. 4, instead of the notches 28 notches 33 are provided forming wings 34 which are bent onto the chamfers 12, 13 and 12a, 13a of the half-ring.

I claim:

1. A twin castor comprising a vertical wall having a semicircular edge and, opposite sides, a tubular hub rigidly and perpendicularly associated to said wall and protruding from both sides thereof, said wall edge and hub forming a support, said support being made of plastic material, a shaft arranged in said tubular hub and having opposite ends, a pair of wheels rotatably supported on said opposite ends, a casing made of metal and having a semi-cylindrical concave surface, a collar integral with said casing and vertically protruding therefrom, a seat provided on said concave surface for positioning said edge therein and means for retaining said edge in said seat.

2. A castor according to claim 1, wherein said semicircular edge is defined by a half-ring projecting from both sides of said wall, said ring having internal chamfered edges and opposite tapered ends, and wherein two parallel ridges are provided on said concave surface and arranged in planes perpendicular to said shaft, said ridges defining said seat for the accommodation of said half-ring, notches being formed in said ridges and defining wings, said wings being bent on said internal chamfered edges and tapered ends to retain said half-ring in said seat.

3. A castor according to claim 2, wherein the notches defining the wings bent on said tapered ends extends along the line connecting said ridges to said concave surface.

4. A castor according to claim 2 comprising a sleeve integral with said half-ring and inserted into said collar, said sleeve rotatably supporting the pivot for the application of the castor to a piece of furniture.

* * * * *

UNITED STATES PATENT OFFICE
CERTIFICATE OF CORRECTION

Patent No. 5,119,525                    Dated June 9, 1992

Inventor(s) Francescantonio Melara

It is certified that error appears in the above-identified patent and that said Letters Patent is hereby corrected as shown below:

On the Title page, item [30], Foreign Application Data, please change "Feb. 2, 1990 (IT) Italy . . . . . . . 3330 A/9" into --Feb.2, 1990 (IT) Italy . . . . . . . 3330 A/90--.

Signed and Sealed this

Twentieth Day of July, 1993

Attest:

MICHAEL K. KIRK

Attesting Officer    Acting Commissioner of Patents and Trademarks